US012686509B2

(12) United States Patent
Hess et al.

(10) Patent No.: US 12,686,509 B2
(45) Date of Patent: Jul. 21, 2026

(54) SYSTEMS AND METHODS FOR LATCHING AND FASTENING OBJECTS FOR IN-SPACE SERVICING, ASSEMBLY, AND MANUFACTURING

(71) Applicant: Enduralock, LLC, Lenexa, KS (US)

(72) Inventors: Harold Hess, Leawood, KS (US); Kishan Srinivas Indrani, Lenexa, KS (US)

(73) Assignee: Enduralock, LLC, Lenexa, KS (US)

( * ) Notice: Subject to any disclaimer, the term of this patent is extended or adjusted under 35 U.S.C. 154(b) by 623 days.

(21) Appl. No.: 18/117,150

(22) Filed: Mar. 3, 2023

(65) Prior Publication Data

US 2023/0278729 A1      Sep. 7, 2023

Related U.S. Application Data

(60) Provisional application No. 63/316,111, filed on Mar. 3, 2022.

(51) Int. Cl.
| | |
|---|---|
| *B64G 1/64* | (2006.01) |
| *H01R 13/639* | (2006.01) |
| *H01R 24/38* | (2011.01) |

(52) U.S. Cl.
CPC ......... *B64G 1/6464* (2023.08); *H01R 13/639* (2013.01); *H01R 24/38* (2013.01)

(58) Field of Classification Search
CPC ............................ B64G 1/6464; H01R 13/639
See application file for complete search history.

(56) References Cited

U.S. PATENT DOCUMENTS

| | | | | |
|---|---|---|---|---|
| 2,892,990 A * | 6/1959 | Werndl | ............... | H01R 13/193 |
| | | | | 200/19.06 |
| 5,082,453 A * | 1/1992 | Stutz, Jr. | .............. | A61N 1/3752 |
| | | | | 439/265 |
| 7,824,203 B2 * | 11/2010 | Littlewood | .......... | H01R 13/629 |
| | | | | 439/265 |
| 8,313,336 B2 * | 11/2012 | Bondo | ................. | H04R 25/556 |
| | | | | 439/324 |

* cited by examiner

*Primary Examiner* — Neil Abrams
(74) *Attorney, Agent, or Firm* — Armstrong Teasdale LLP

(57) ABSTRACT

A fastener system for use with in-space structures includes a first connector attachable to a first in-space structure, and a second connector attachable to a second in-space structure. The first connector includes a first housing and a first connection member. The second connector includes a second housing and a second connection member. The second housing has an inner surface defining a recess sized to receive the first housing. The inner surface of the second housing is shaped to guide the first housing into position for the at least first connection member to engage the at least one second connection member within the recess. The fastener system also includes an actuator configured to move one of the first connector or the second connector in to position to engage the other of the first connector or the second connector.

20 Claims, 12 Drawing Sheets

100

110

108

106

116

114

118

SYSTEMS AND METHODS FOR LATCHING AND FASTENING OBJECTS FOR IN-SPACE SERVICING, ASSEMBLY, AND MANUFACTURING

CROSS-REFERENCE TO RELATED APPLICATION

This application claims priority to U.S. Provisional Application No. 63/316,111 filed Mar. 3, 2022, the content of which is incorporated herein by reference in its entirety.

BACKGROUND

The field of the disclosure relates generally to latching and fastening mechanisms, and more specifically to latching and fastening mechanisms for in-space servicing, assembly, and manufacturing.

In-space structures such as satellites and space stations orbit around planets or other gravitational bodies and provide many services for humans. For example, satellite have become crucial for use in systems that are vital in humans daily lives such as telecommunication and global positioning systems. However, the in-space structures can be difficult and expensive to assemble and maintain. For example, some satellites must be assembled or repaired while the satellite is in orbit. The systems to assemble or repair the in-space structures require precise handling and positioning of the in-space structures and parts. However, the components may be difficult to control remotely or in space and/or may not provide a secure attachment of two structures. In addition, in-space structures may require separate specialized components to facilitate transfer of electrical power, fluid, or other systems.

Therefore, there is a need for systems and methods for latching and fastening objects for in-space servicing, assembly, and manufacturing.

BRIEF DESCRIPTION OF THE DISCLOSURE

In one aspect, a fastener system for use with in-space structures includes a first connector attachable to a first in-space structure, and a second connector attachable to a second in-space structure. The first connector includes a first housing and at least one first connection member. The second connector includes a second housing and at least one second connection member. The second housing has an inner surface defining a recess sized to receive the first housing. The inner surface of the second housing is shaped to guide the first housing into position for the at least one first connection member to engage the at least one second connection member within the recess. The fastener system also includes an actuator configured to move one of the first connector or the second connector into position to engage the other of the first connector or the second connector.

In another aspect, a method of connecting in-space structures includes moving a first in-space structure relative to a second in-space structure. The first in-space structure includes a first connector having a first housing and at least one first connection member. The second in-space structure includes a second connector having a second housing and at least one second connection member. The second housing includes an inner surface defining a recess sized to receive the first housing. The method also includes positioning the first housing within the recess defined by the second housing, guiding the first housing along the inner surface and into position for the at least one first connection member to engage the at least one second connection member within the recess, and connecting the at least one first connection member to the at least one second connection member.

In yet another aspect, a system for use in space includes a first in-space structure including a first connector, and a second in-space structure including a second connector. The first connector includes a first housing and at least one first connection member. The second connector includes a second housing and at least one second connection member. The second housing has an inner surface defining a recess sized to receive the first housing. The inner surface of the second housing is shaped to guide the first housing into position for the at least one first connection member to engage the at least one second connection member within the recess. The system also includes an actuator configured to move one of the first connector or the second connector into position to engage the other of the first connector or the second connector.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Relative descriptors used herein such as upward, downward, left, right, up, down, length, height, width, thickness, and the like are with reference to the figures, and not meant in a limiting sense. Additionally, the illustrated embodiments can be understood as providing exemplary features of varying detail of certain embodiments, and therefore, features, components, modules, elements, and/or aspects of the illustrations can be otherwise combined, interconnected, sequenced, separated, interchanged, positioned, and/or rearranged without materially departing from the disclosed fastener assemblies. Additionally, the shapes and sizes of components are also exemplary and can be altered without materially affecting or limiting the disclosed technology.

As used herein, the phrase "space", "in-space", and "in-space structures" refers to structures or components that are in or designed to be placed into outer space. For example, "in-space structure" may refer to satellites in or out of orbit.

Figure 1:
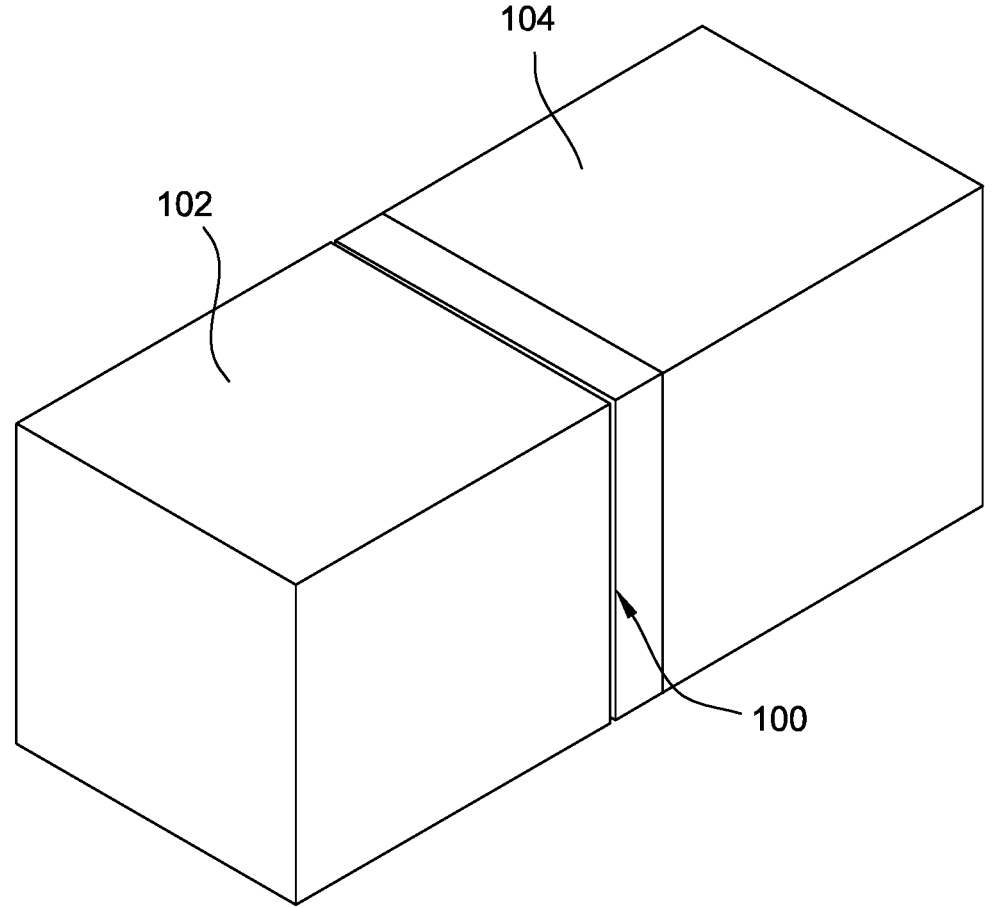
FIG. 1 is a perspective view of two structures secured together by a fastener system.
Figure 2:
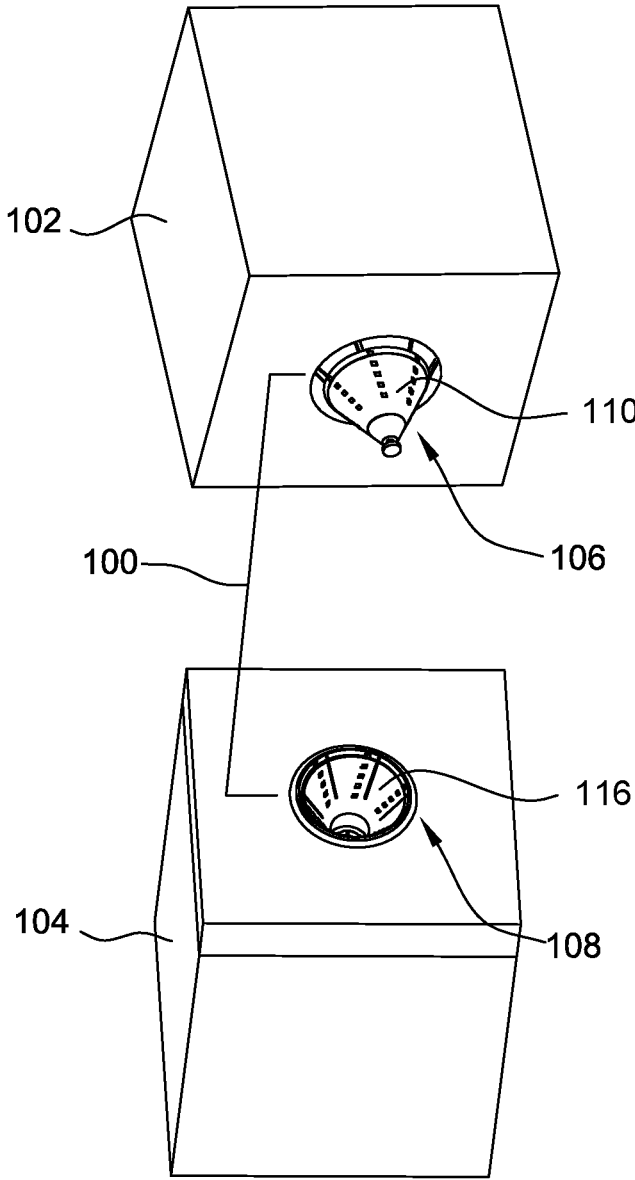
FIG. 2 is a perspective view of the two structures of FIG. 1, separated from each other to illustrate components of the fastener system.
Figure 3:
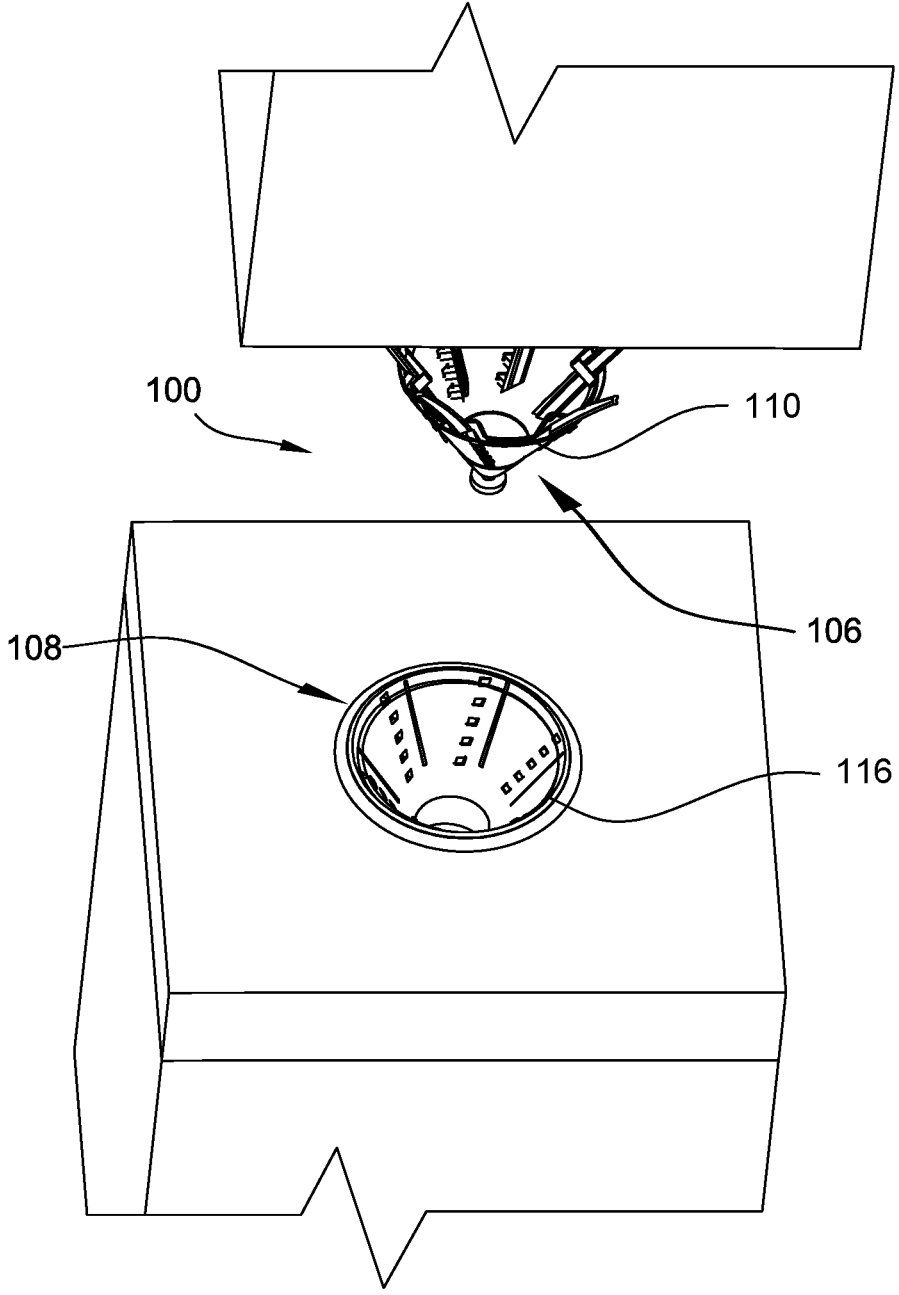
FIG. 3 is a partially exploded version of a portion of the structures and fastener system of FIG. 1.
Figure 4:
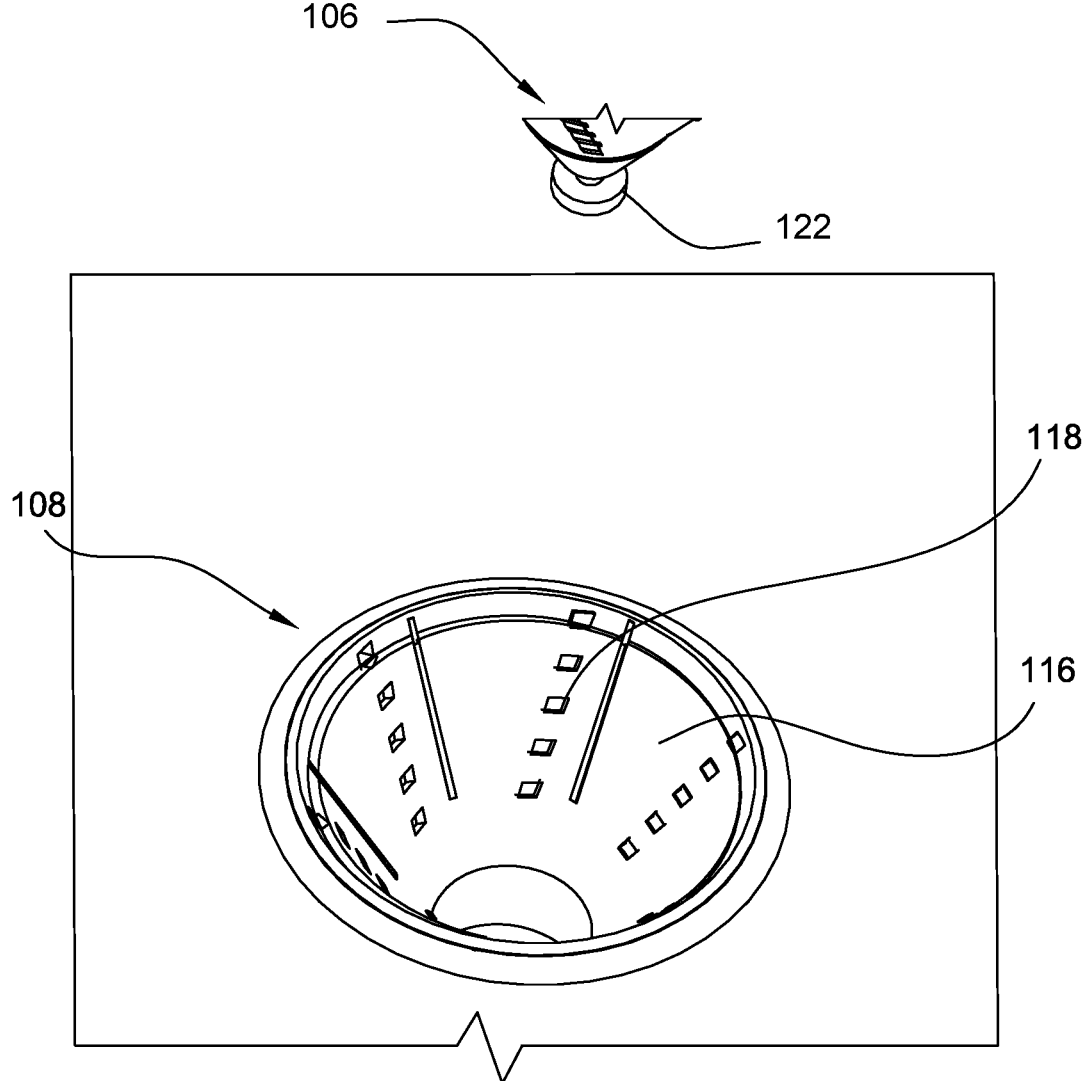
FIG. 4 is an enlarged view of the structures and the fastener system of FIG. 3.

As illustrated in FIG. 1, a fastener system 100 is configured to connect two or more structures (e.g., a first in-space structure 102 and a second in-space structure 104). The fastener system 100 provides for secure latching and fastening of structures for servicing, assembly, and manufacturing even while the structures are in outer space (in or out of an orbit). The fastener system 100 provides many advantages for use with in-space structures. For example, the system provides self-aligning and simple, secure connection mechanisms. The fastener system 100 may be used with other structures besides in-space structures that may benefit from the system.

Referring to FIGS. 2-5, the fastener system 100 includes a first connector 106 that is attachable to the first in-space structure 102 and a second connector 108 that is attachable to the second in-space structure 104. The first connector 106 includes a first housing 110, an actuator 112, and at least one connection member 114. The at least one first connection member 114 is movably coupled to the first housing 110 and is switched between a first position and a second position by the actuator 112. In the example, the actuator 112 is a rotary actuator that includes a plurality of outer surfaces 115 that engage the connection members 114 when the actuator is rotated, for example, in a clockwise direction. The surfaces are sloped and cause at a least a portion of the connection members 114 to be displaced, for example, circumferentially, relative to the housing when the actuator is rotated. In other embodiments, the actuator 112 is a linear actuator that moves along the central axis to engage and cause the connection members 114 to be displaced circumferentially or in a direction parallel to a central axis of the first housing 110. Accordingly, the fastener system 100 may operate using a rotary style actuator or a linear style actuator that facilitates switching the fastener system between an unlocked configuration and a locked configuration.

Figure 6:
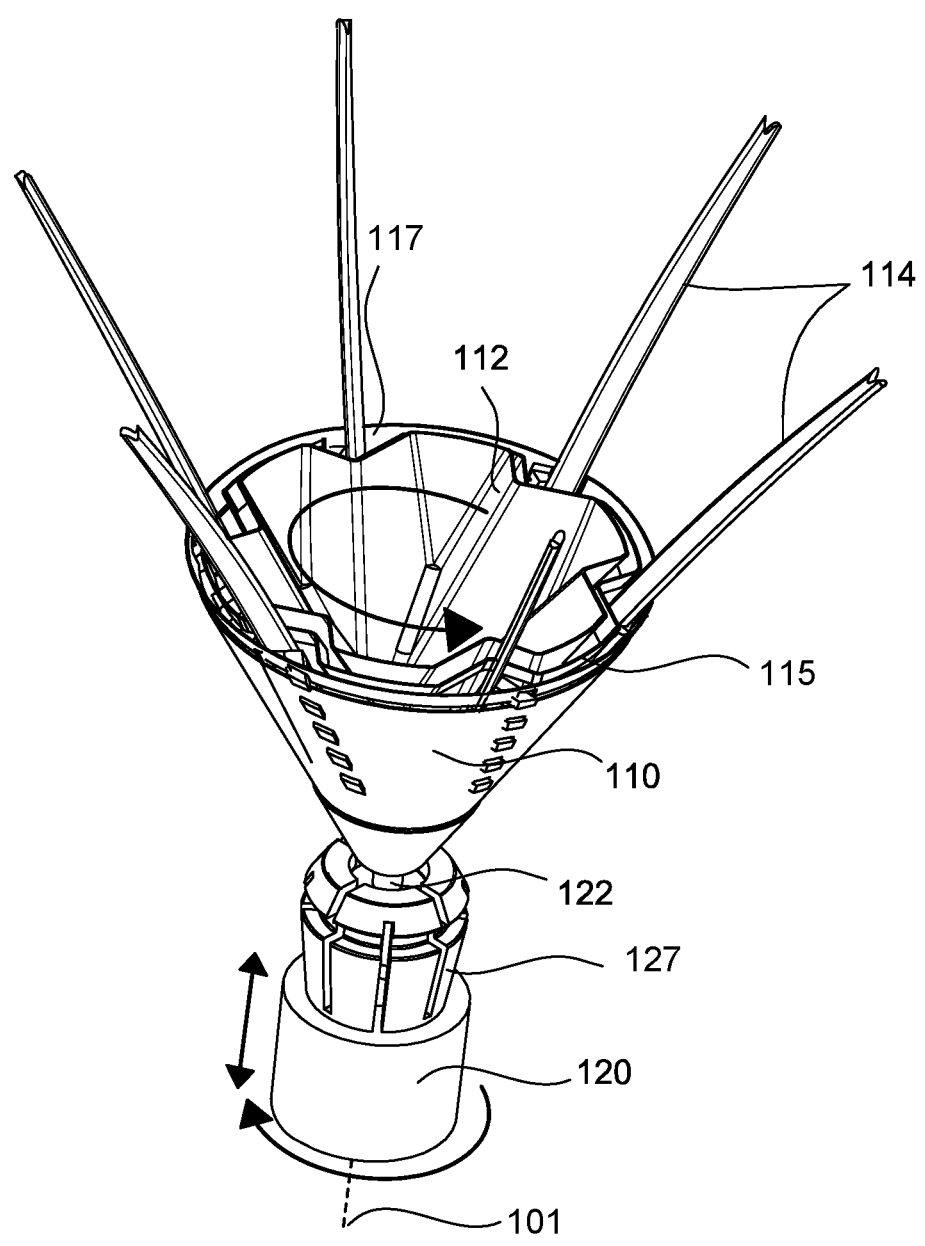
FIG. 6 is a schematic view of a portion of the fastener system including a first housing, an actuator, and a lock mechanism.
Figure 14:
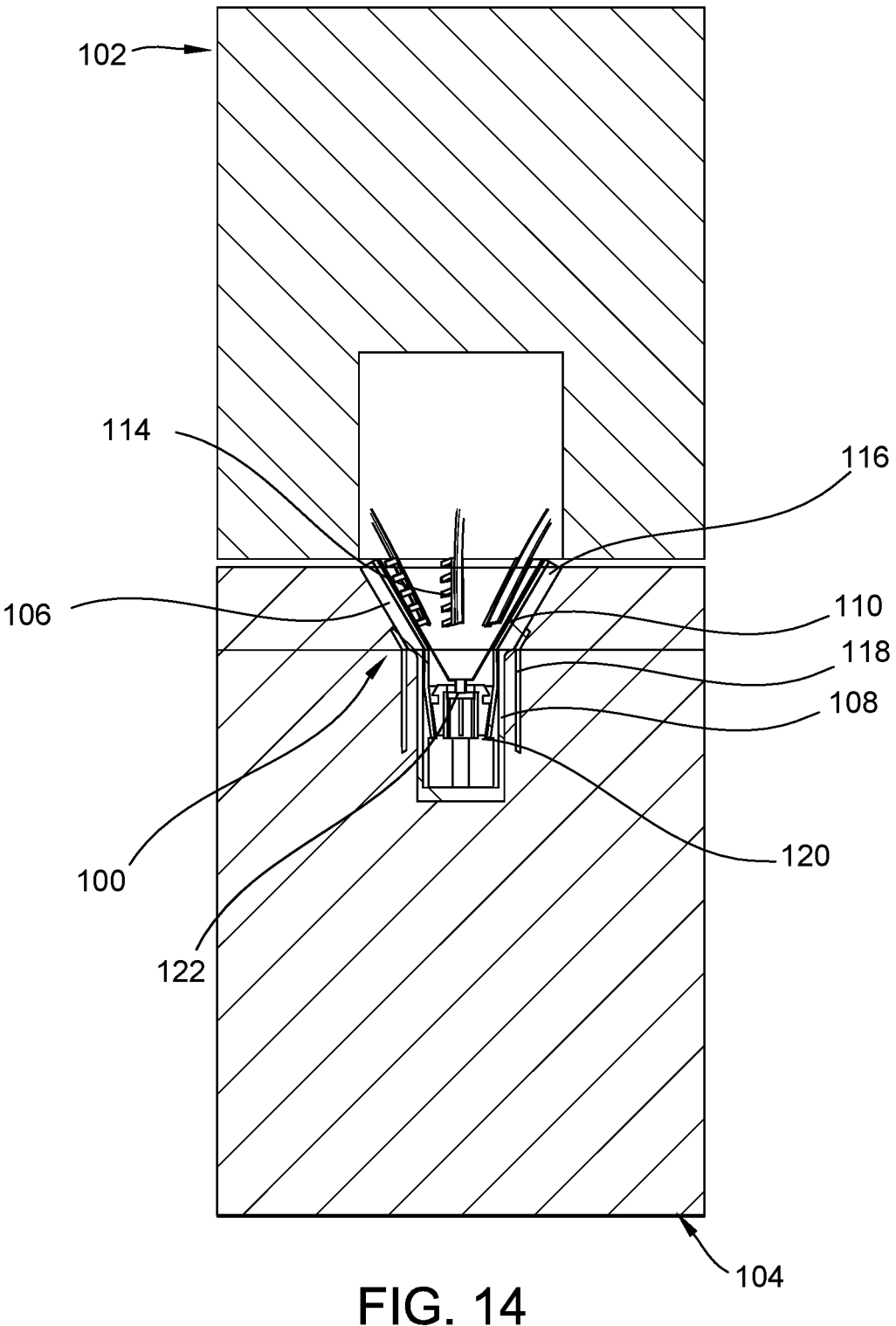
FIG. 14 is a sectional view of the two structures of FIG. 1 secured together by the fastener system, where the first connector housing is positioned within the recess defined by the second connector housing and the first and second connection members are engaged with each other.

As seen in FIG. 6, the actuator 112 is sized and shaped to be received in the first housing 110 such that first housing acts as a sleeve about the actuator. For example, the first housing 110 is a cone, and the actuator 112 is conical or frustoconical. In other embodiments, the first housing 110 and/or the actuator 112 may be other shapes without departing from some aspects of the disclosure. The first connection members 114 extend at least partly between the outer surfaces 115 of the actuator 112 and an inner surface 117 of the first housing 110. As seen in FIGS. 6 and 14, the first housing 110 and the first connection members 114 are positioned at least partly between the actuator 112 and the second housing 116 when the first connector and the second connector are secured together.

Referring to FIGS. 8-11, the second connector 108 includes a second housing 116 and at least one second connection member 118. The second housing 116 defines a recess sized to receive the first housing 110. The at least one second connection member 118 is disposed at least partly on an interior surface of the second housing 116 and engages that at least one first connection member 114 when the at least one first connection member 114 is in the second position and the first housing 110 is positioned within the recess defined by the second housing 116.

With reference to FIGS. 2-4 and 14, the shape of the second housing 116 corresponds to the shape of the first housing 110, and the recess defined by the second housing 116 is shaped to receive the first housing 110. For example, the second housing 116 is a cone and includes a curved interior surface that is shaped to guide the first housing 110 toward a center of the recess. Accordingly, the first housing 110 and the second housing 116 provide a self-aligning feature of the fastener system 100.

Figure 12:
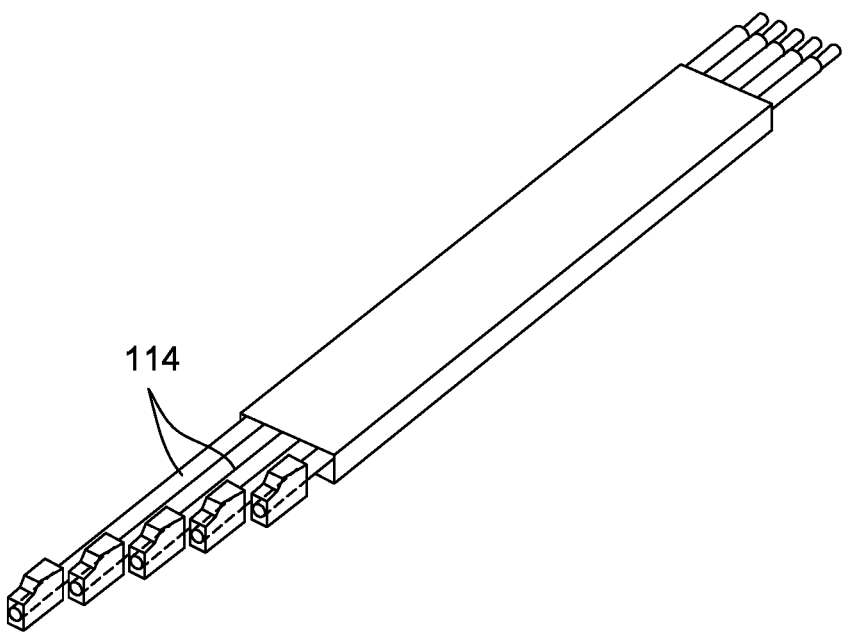
FIG. 12 is a perspective view of the at least one first connection member of the first connector.
Figure 13:
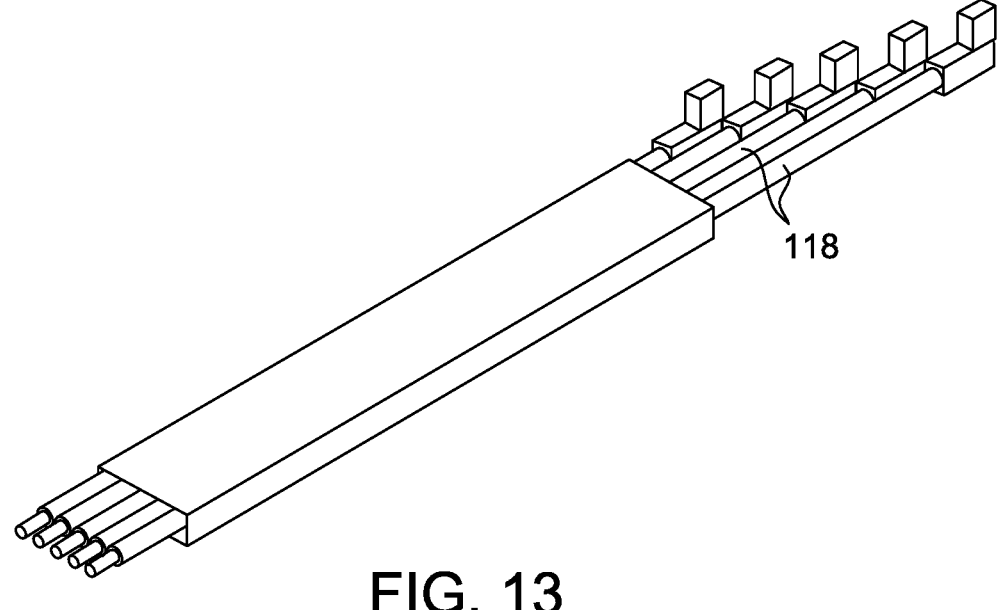
FIG. 13 is a perspective view of the at least one second connection member of the second connector.

In embodiments, the at least one first connection member 114 and the at least one second connection member 118 each include electrical contacts and are configured to provide an electrical connection between the first in-space structure and the second in-space structure. For example, as illustrated in FIGS. 12 and 13, the at least one first connection member 114 and the at least one second connection member 118 may comprise resign embedded cable connectors. The cable connectors are shaped to engage and secure to opposing cable connectors. In other embodiments, the connection member 114, 118 may include mechanical fasteners that engage each other to mechanically secure the connectors together. In further embodiments, the connection members 114, 118 act as electrical connectors and mechanical connectors.

The connection members 114, 118 each extend along a longitudinal axis and have contacts that extend from opposite longitudinal ends of the connection members. The connection members 114, 118 each include an elongated casing or housing that extends along the longitudinal axis and protects the conductors within the connection members. The connection members 114, 118 may have different lengths that correspond to their position on the housings. In addition, two or more of the connection members 114, 118 may be grouped together. For example, in the illustrated embodiment, the respective connection members 114, 118 are arranged in groups of five that are attached together and each connection member in the group has a different length that corresponds to an opening or position on the surface of the respective housing.

Figure 5:
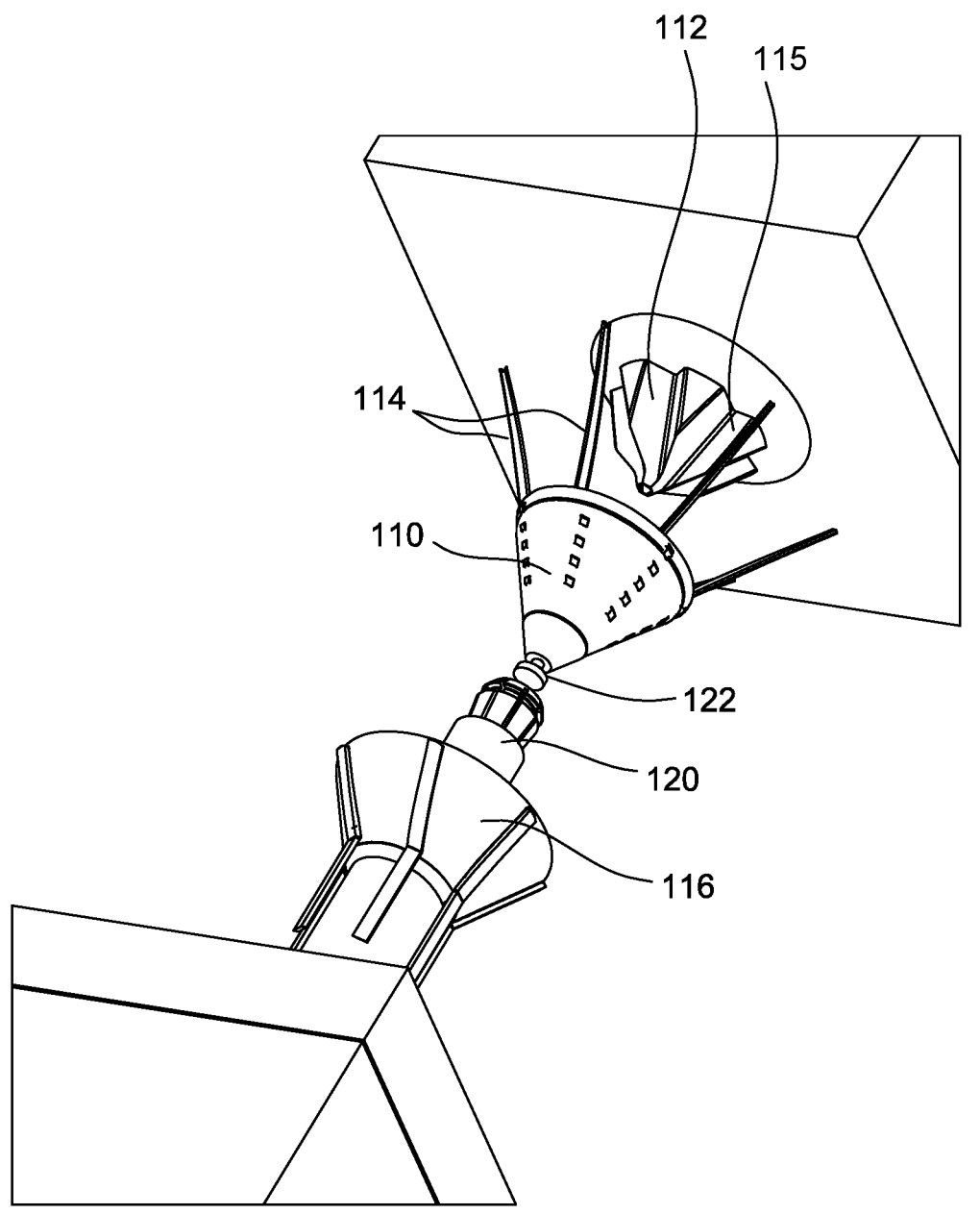
FIG. 5 is an exploded perspective view of the structures and the fastener system of FIGS. 3 and 4.
Figure 7:
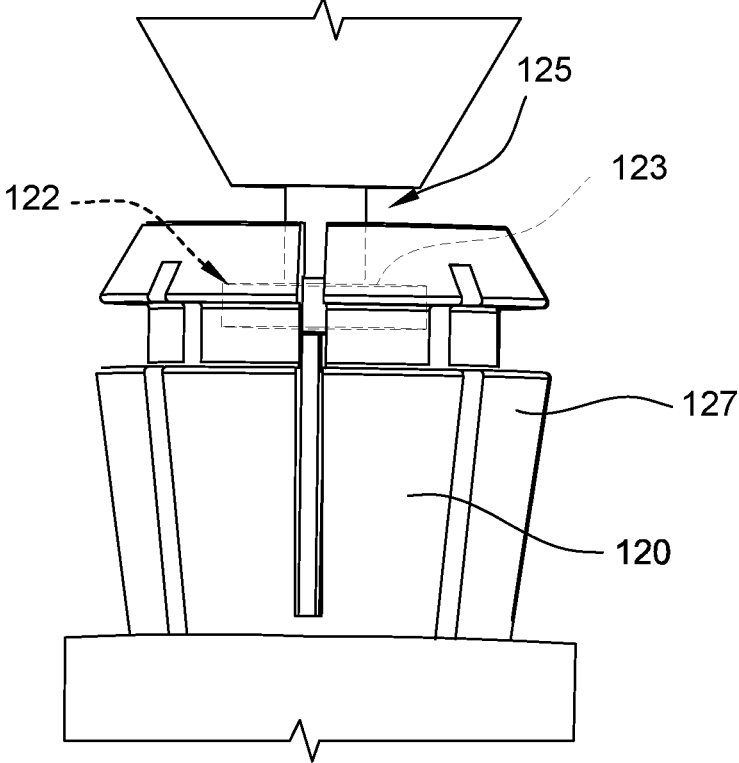
FIG. 7 is a side view of the lock mechanism of FIG. 6 engaged with a protrusion on the first housing.
Figure 8:
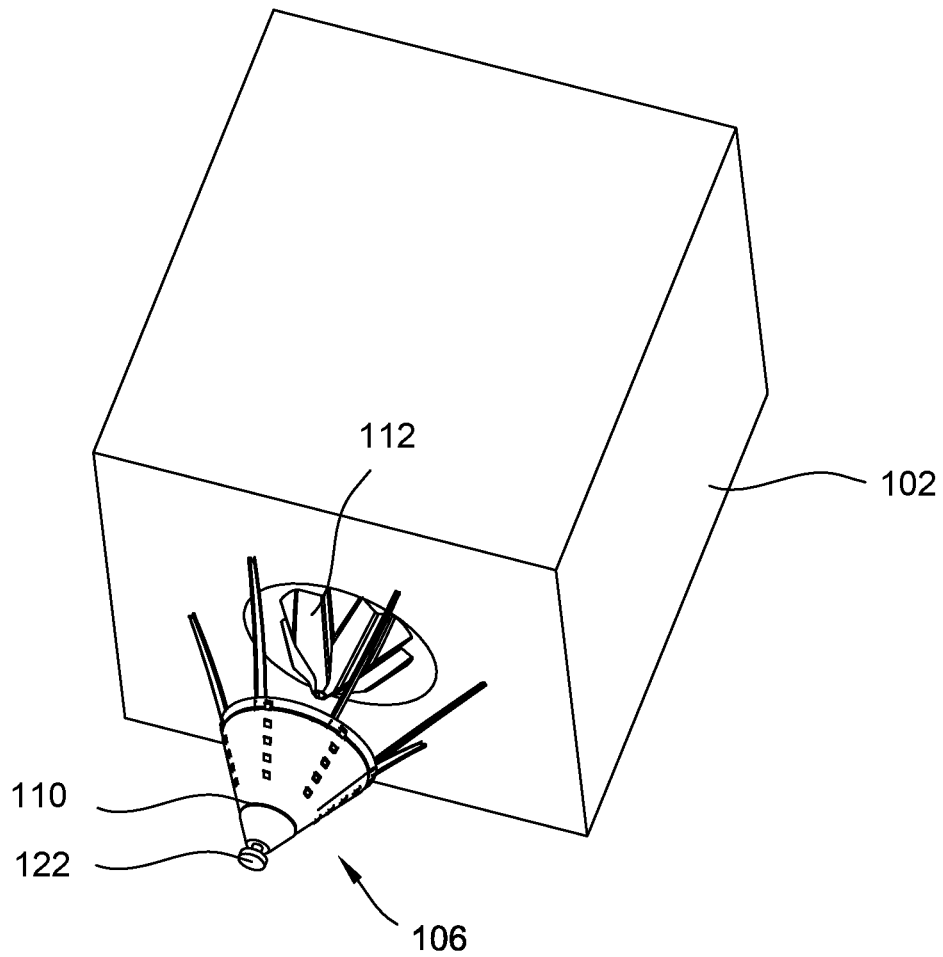
FIG. 8 is a perspective view of a first structure and a first connector with a first housing displaced to illustrate an actuator.
Figures 9, 10, 11:
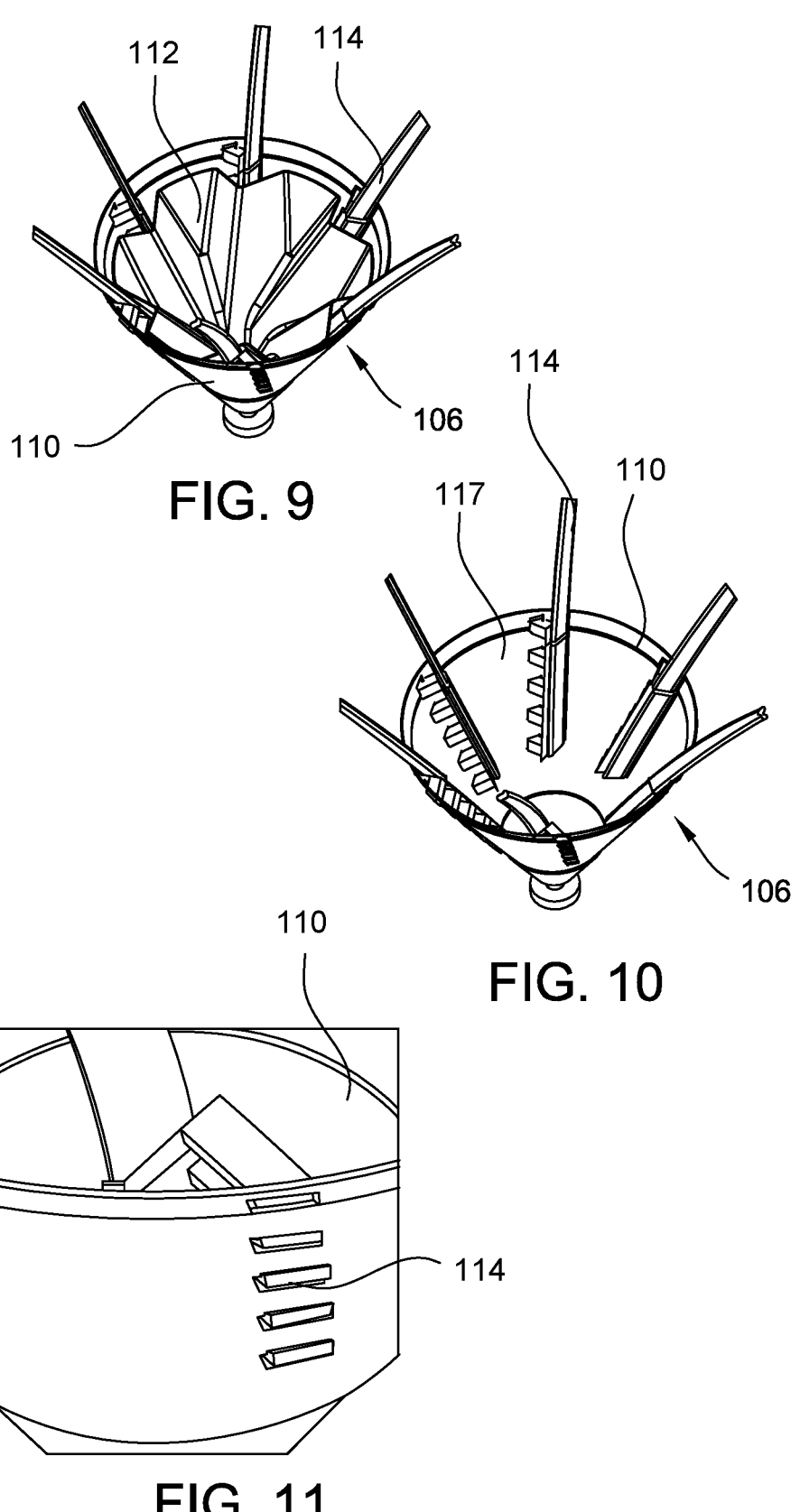
FIG. 9 is a perspective view of the first connector of FIG. 8, the first connector including the first housing, the actuator, and at least one first connection member.
FIG. 10 is a perspective view of an interior of the first connector illustrating the at least one first connection member attached to the first housing.
FIG. 11 is an enlarged view of the at least one first connection member attached to the first housing.

As illustrated in FIGS. 5-7, a lock mechanism 120 is attached to one of the first housing 110 and the second housing 116 and used to secure the first connector 106 to the second connector 108. For example, the lock mechanism 120 is attached to the second housing 116 and disposed within the recess defined by the second housing. A protrusion 122 is disposed on the other of the first housing 110 and the second housing 116. For example, the protrusion 122 extends from a tip of the first housing 110. The lock mechanism 120 is arranged to receive and engage the protrusion 122 to secure the first in-space structure 102 in position relative to the second in-space structure 104 when the first housing 110 is inserted into the second housing 116. The shape of the first and second housings 110, 116 guide the protrusion 122 into engagement with the lock mechanism 120. For example, the sloped surfaces on the first and second housings 110, 116 contact each other and move the first housing toward the center of the recess to automatically align the protrusion 122 on the tip of the first housing with the center of the lock mechanism 120 within the center of the second housing.

As seen in FIG. 7, the lock mechanism, e.g., a collet lock, 120, includes at least one lock surface or feature that is configured to engage and entrap the protrusion 122. For example, the lock mechanism 120 includes one or more features or walls that define a cylindrical recess to receive the protrusion. In addition, the protrusion 122 includes a lock surface that is configured to engage with the lock mechanism 120. For example, the protrusion 122 includes a lock surface 123 defining a gap or slot 125 that receives at least a portion of the lock mechanism 120 to secure the protrusion within the lock mechanism 120. In addition, in the example, the lock mechanism 120 includes at least one movable feature 127 that is displaceable between a first position in which the feature allows the protrusion 122 to enter the recess and a second position in which the feature extends into the slot 125 and engages the lock surface 123 of the protrusion 122. In the illustrated embodiment, the lock mechanism 120 is arranged as a collet lock. In other suitable embodiments, the fastener system 100 may include other lock mechanisms without departing from some aspects of the disclosure.

Referring to FIGS. 8-11, the system includes a plurality of the first connection members 114 and a plurality of the second connection members 118. The first connection members 114 are disposed about the circumference of the cone and extend at least partly on an exterior of the first housing 110. For example, the first connection members 114 extend through openings in the first housing 110. The first connector 106 may be connected to the first in-space structure such that the first connection members 114 are in electrical connection within one or more components of the first in-space structure. Springs on the first connection members 114 may bias the first connection members 114 relative to the housing and facilitate engagement with the actuator. In the example, a rotary actuator would engage the actuating sleeve against electrical/mechanical connectors mounted on the spring strip into the receptors (e.g., second connection members) in the second connector. The spring mechanisms may include, for example and without limitation, a metal strip or mechanical springs.

The plurality of second connection members 118 are disposed at least partly on the interior surface of the second housing 116 at locations that correspond to the locations of the first connection members 114 on the first housing 110. For example, the second connection members 118 may extend through openings in the second housing 116 and may extend into the second in-space structure such that the second connection members 118 are in electrical connection within one or more components of the second in-space structure.

FIG. 14 is a sectional view of the two structures 102, 104 of FIG. 1 secured together by the fastener system 100. When the structures 102, 104 are secured together by the fastener system 100, the first housing 110 is positioned within the recess defined by the second housing 116 and the first and second connection members 114, 118 are engaged with each other. Also, in the secured position, the first and second housings 110, 116 are positioned in a cavity in the second structure 104. When the structures 102, 104 are disconnected, the first housing 110 may be positioned in a cavity in the first structure 102, and the second housing 116 may be positioned in the cavity in the second structure 104. The structures 102, 104 may have actuator(s) configured to move the first housing 110 and/or the second housing 116 into or out of the cavities in the structures 102, 104 and/or relative to the other of the first housing or the second housing. For example, the first housing 110 is connected to an actuator positioned in the first structure 102 which moves the first housing 110 relative to the first structure.

Referring to FIGS. 1-6 and 14, a method of assembling a space system includes providing one or more in-space structures (e.g. structures 102, 104). The first connector 106 is assembled by connecting the first connectors 114 to the first housing 110 and operatively connecting the actuator 112 to the first connector 106. For example, the first housing 110 is positioned onto the actuator 112 with the first connectors 114 between the first housing and the actuator and in operative connection with the actuator. The first connector 106 is attached to the first structure 102.

The second connector 108 is assembled by connecting the second connectors 118 to the second housing 116. The second connectors 118 extend along the interior surface of the second housing 116 and at least partly into the recess defined by the second housing. The lock mechanism 120 is positioned within the recess defined by the second housing 116 and arranged to receive the protrusion 122.

After the first and second connectors 106, 108 are assembled, the structures 102, 104 may be secured together. For example, a method of connecting in-space structures (e.g. structures 102, 104) includes moving the first in-space structure relative to the second in-space structure to position the first connector 106 relative to the second connector 108. For example, the fastener system 100 and/or the structures 102, 104 may be actuated remotely to achieve desired positions. In some embodiments, an actuator is operatively connected to the first housing 110 and configured to move the first connector 106 between a stowed position and an extended position (shown in FIG. 14). In the extended position, the first housing 110 is arranged to be inserted into the recess defined by the second housing 116. The structures 102, 104 are positioned such that the first housing 110 is positioned within the recess defined by the second housing 116. The configuration of the fastener system 100 provides for self-alignment and simplifies the positioning of the structures 102, 104 for securement together. A securement device (e.g., the lock mechanism 120) is disposed within the recess and engages the protrusion 122 on the second housing 116 to secure the connectors 106, 108 in position for engagement. For example, the protrusion 122 in the structure 102 self-aligns with the lock mechanism 120. The lock mechanism 120 acts a female receiver, and the protrusion 122 acts a male engagement part or plunger. In some embodiments, engagement of the lock mechanism 120 and the protrusion 122 engages a roto-linear actuator which enables the lock mechanism 120 to engage and secure the locking feature or protrusion 122 in the other structure and orients the first housing 110 relative to the second housing 116 as the lock mechanism 120 and the protrusion 122 engage. As shown in FIG. 6, the roto-linear actuator may rotate the lock mechanism 120 and/or the protrusion 122 about an axis 101 and/or move the lock mechanism linearly along the axis. As a result, the structures 102, 104 are positioned to a required orientation relative to each other automatically when the fastener system 100 is secured.

The method also includes switching, using the actuator 112, the at least one first connection member 114 between the first position and the second position to engage the first connection member with the at least one second connection member 118 within the recess. For example, the actuator 112, which may be rotary or linear, engages the first connection members 114 and causes the first connection members to move toward and engage the second connection members 118 within the recess. The first and second connection members 114, 118 engage each other to provide an electrical and/or mechanical connection between the first structure 102 and the second structure 104.

To release the structures 102, 104, the actuator 112 causes the first connection members 114 to move back to the first position, and, thereby, disengage from the second connection members 118. Then, the lock mechanism 120 releases the protrusion 122. For example, the movable features 127 are displaced and moved out of the gap 125 and the protrusion 122 is allowed to move out of the cavity of the lock mechanism 120. The first structure 102 may be moved relative to the second structure 104 when the first connection members 114 are disengaged from the second connection members 118 and the protrusion 122 is released from the lock mechanism 120.

The steps of the methods are described in an ordered combination that provides benefits. However, in some embodiments, the steps may be performed in other orders and/or steps may be omitted/added without departing from some aspects of the disclosure.

In some embodiments, the structures 102, 104 are placed into space (in orbit or not in orbit). In such embodiments, the steps of the methods may be performed before and/or after the structures 102, 104 are placed into space. For example, the first and second connectors 108 may be assembled and attached to the structures prior to the structures 102, 104 being placed into space. Then, while in space, the structures 102, 104 are connected together and/or disconnected from each other using the fastener system 100. The system and methods facilitate the structures 102, 104 latching/unlatching and fastening/unfastening while in space for in-space servicing, assembly, and manufacturing.

Figure 15:
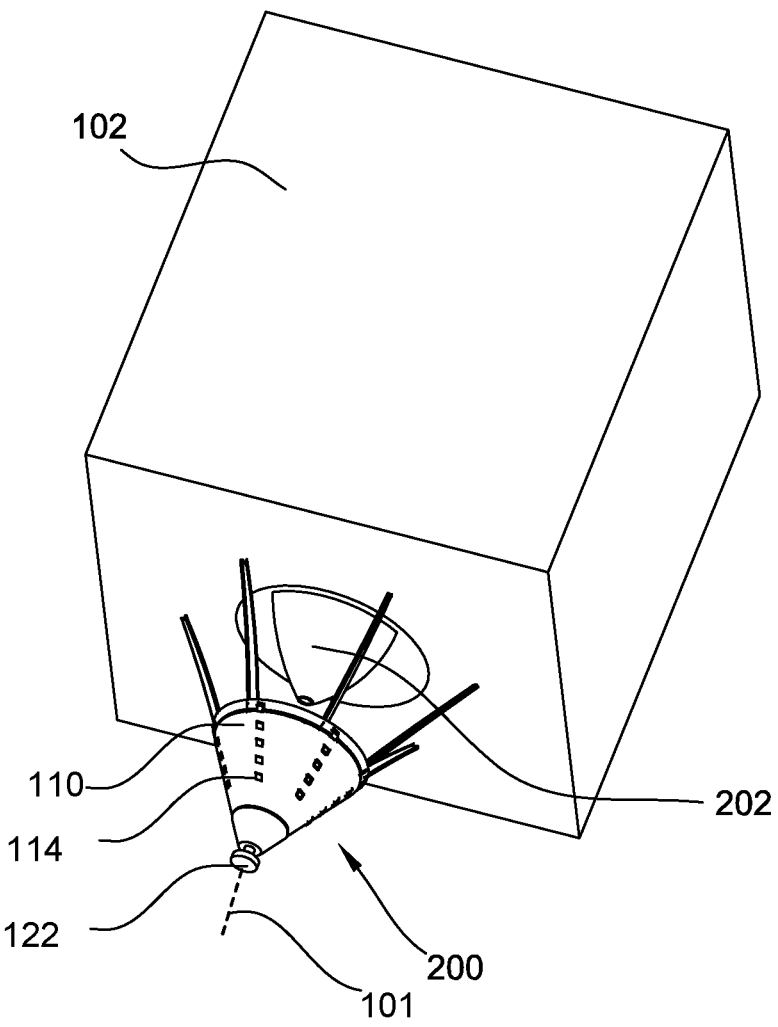
FIG. 15 is a perspective of an alternative embodiment of a first connector for use with the fastener system of FIG. 1, the first connector attached to one of the structures with the first housing displaced to illustrate an actuator.

FIG. 15 is a perspective of an alternative embodiment of a first connector 200 for use with the fastener system 100 of FIG. 1. The first connector 200 is similar to the first connector 106 except the first connector 200 includes a linear actuator 202. The linear actuator 202 moves along a central axis of the first housing 110. The linear actuator 202 engages the actuating sleeve (e.g., the first housing 110) and presses electrical/mechanical connectors (e.g., first connection members) mounted on the spring strip into the receptors (e.g., second connection members) in the second in-space structure 104.

Exemplary embodiments of fastener systems are described above. The systems and methods are not limited to the specific embodiments described herein, but rather, components of the systems and/or operations of the methods may be utilized independently and separately from other components and/or operations described herein. Further, the described components and/or operations may also be defined in, or used in combination with, other systems, methods, and/or devices, and are not limited to practice with only the systems described herein.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fastener system for use with in-space structures, the fastener system comprising:

a first connector attachable to a first in-space structure, the first connector including a first housing and at least one first connection member;

a second connector attachable to a second in-space structure, the second connector including a second housing and at least one second connection member, wherein the second housing has an inner surface defining a recess sized to receive the first housing, wherein the inner surface of the second housing is shaped to guide the first housing into position for the at least one first connection member to engage the at least one second connection member within the recess; and an actuator configured to move one of the at least one first connection member through the first housing, or the at least one second connection member through the second housing, and into position to engage the other of the at least one first connection member or the at least one second connection member for connecting the first in-space structure to the second in-space structure.

2. A fastener system in accordance with claim 1, wherein the actuator is operatively attached to the at least one first connection member, wherein the at least one first connection member is movably coupled to the first housing and is switched between a first position and a second position by the actuator, wherein the at least one second connection member engages that at least one first connection member when the at least one first connection member is in the second position and the first housing is positioned within the recess defined by the second housing.

3. A fastener system in accordance with claim 1, wherein the at least one first connection member and the at least one second connection member include electrical contacts and are configured to provide an electrical connection between the first in-space structure and the second in-space structure.

4. A fastener system in accordance with claim 3, wherein the at least one first connection member and the at least one second connection member comprise resign embedded cable connectors.

5. A fastener system in accordance with claim 1, wherein the at least one first connection member and the at least one second connection member include engagement members that are arranged to mechanically couple the first in-space structure and the second in-space structure.

6. A fastener system in accordance with claim 1, wherein the actuator comprises a rotary actuator or a linear actuator.

7. A fastener system in accordance with claim 1, wherein the first housing is a cone.

8. A fastener system in accordance with claim 7, wherein the at least one first connection member comprises a plurality of first connection members disposed around a circumference of the cone.

9. A fastener system in accordance with claim 8, wherein the recess has a shape that corresponds to the shape of the first housing, and wherein the at least one second connection member comprises a plurality of second connection members disposed at least partly on an interior surface of the second housing at locations that correspond to the locations of the first connection members.

10. A fastener system in accordance with claim 1, further comprising a lock mechanism attached to one of the first housing and the second housing, and a protrusion disposed on the other of the first housing and the second housing, wherein the lock mechanism is arranged to receive and engage the protrusion to secure the first in-space structure in position relative to the second in-space structure.

11. A method of connecting in-space structures, the method comprising:
    moving a first in-space structure relative to a second in-space structure, the first in-space structure including a first connector having a first housing and at least one first connection member, the second in-space structure including a second connector having a second housing and at least one second connection member, wherein the second housing includes an inner surface defining a recess sized to receive the first housing;
    positioning the first housing within the recess defined by the second housing;
    guiding the first housing along the inner surface and into position for the at least one first connection member to engage the at least one second connection member within the recess; and
    moving, by an actuator, one of the at least one first connection member through the first housing, or the at least one second connection member through the second housing, and into position to engage the other of the at least one first connection member or the at least one second connection member for connecting the first in-space structure to the second in-space structure.

12. A method in accordance with claim 11, wherein connecting the at least one first connection member to the at least one second connection member comprises switching, using the actuator, the at least one first connection member between a first position and a second position, wherein in the second position the at least one first connection member is configured to engage the at least one second connection member.

13. A method in accordance with claim 11, wherein connecting the at least one first connection member to the at least one second connection member comprises connecting electrical contacts on the at least one first connection member to electrical contacts on the at least one second connection member to provide an electrical connection between the first in-space structure and the second in-space structure.

14. A method in accordance with claim 11, wherein the first housing is a cone, and the inner surface of the second housing has a curve that corresponds to the cone shape of the first housing and defines a center, wherein guiding the first housing along the inner surface comprises guiding the first housing along the curve of the inner surface toward the center of the recess.

15. A space system comprising:
    a first in-space structure including a first connector, the first connector including a first housing and at least one first connection member;
    a second in-space structure including a second connector, the second connector including a second housing and at least one second connection member, wherein the second housing has an inner surface defining a recess sized to receive the first housing, wherein the inner surface of the second housing is shaped to guide the first housing into position for the at least one first connection member to engage the at least one second connection member within the recess; and
    an actuator configured to move one of the at least one first connection member through the first housing, or the at least one second connection member through the second housing, and into position to engage the other of the at least one first connection member or the at least one second connection member for connecting the first in-space structure to the second in-space structure.

16. A space system in accordance with claim 15, wherein the actuator is operatively attached to the at least one first connection member, wherein the at least one first connection member is movably coupled to the first housing and is switched between a first position and a second position by the actuator, wherein the at least one second connection member engages that at least one first connection member when the at least one first connection member is in the second position and the first housing is positioned within the recess defined by the second housing.

17. A space system in accordance with claim 15, wherein the at least one first connection member and the at least one second connection member include electrical contacts and are configured to provide an electrical connection between the first in-space structure and the second in-space structure.

18. A space system in accordance with claim 15, wherein the actuator comprises a rotary actuator or a linear actuator.

19. A space system in accordance with claim 15, wherein the actuator is coupled to the first housing of the first connector and is configured to move the first housing between a first position and a second position.

20. A space system in accordance with claim 15 further comprising a lock mechanism attached to one of the first housing and the second housing, and a protrusion disposed on the other of the first housing and the second housing, wherein the lock mechanism is arranged to receive and engage the protrusion to secure the first in-space structure in position relative to the second in-space structure.

* * * * *